H. TAYLOR.
AUTOMATIC OIL LUBRICATOR.
APPLICATION FILED FEB. 20, 1918.
1,276,446.
Patented Aug. 20, 1918.
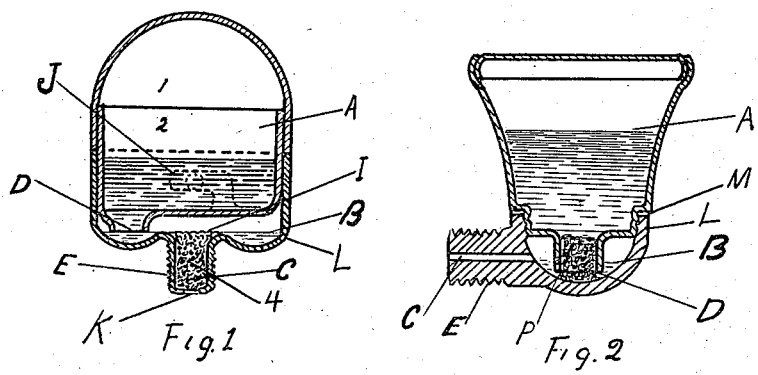
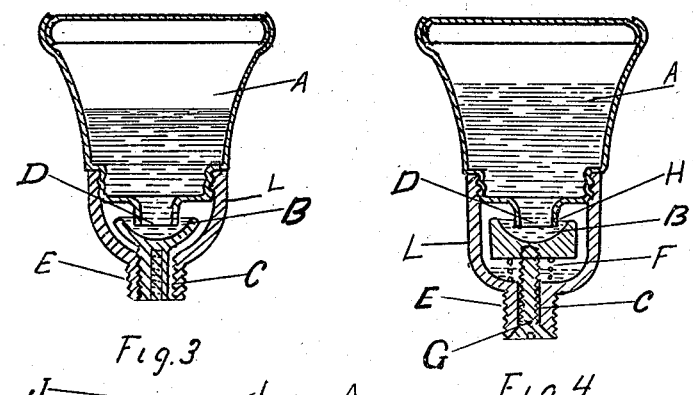
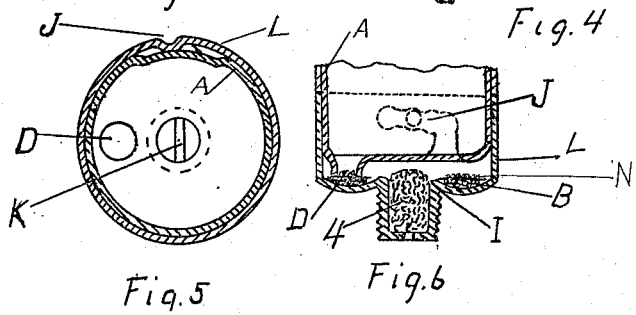
INVENTOR
Huston Taylor,
BY
ATTORNEYS

UNITED STATES PATENT OFFICE.

HUSTON TAYLOR, OF REDFORD, MICHIGAN.

AUTOMATIC OIL-LUBRICATOR.

1,276,446.  Specification of Letters Patent.  Patented Aug. 20, 1918.

Application filed February 20, 1918. Serial No. 218,184.

*To all whom it may concern:*

Be it known that I, HUSTON TAYLOR, a citizen of the United States, and residing at Redford, in the county of Wayne and State of Michigan, have invented a new and Improved Automatic Oil-Lubricator, of which the following is a specification.

My invention relates to improvements in oil lubricators which are carried on parts of a machine or vehicle, particularly on motor driven vehicles, which are subjected to jars and vibrations, and the object of my invention is to provide an oil reservoir in which oil is sustained by atmospheric pressure and from which it may flow to the part to be lubricated, according as air is admitted to said reservoir, and means to regulate the admission of air.

I attain this object by the constructions illustrated in the accompanying drawings.

Figure 1 is a vertical section of the lubricator.

Fig. 2 is a vertical section of another form of the lubricator having a right angle elbow at its base.

Fig. 3 is a vertical section of another form of the lubricator having a screw adjustment in the base.

Fig. 4 is a vertical section of another construction of the lubricator having a spring and screw adjustment in the base.

Fig. 5 shows a horizontal sectional view corresponding to Fig. 1 on the plane of the horizontal slot J.

Fig. 6 is a partial detail vertical sectional view of the bayonet slot showing a slight modification of the bayonet clutch shown in Fig. 1.

Similar letters refer to similar parts on the several forms except where a differing feature is embodied.

Fig. 1 shows a form of the lubricator in which the oil reservoir A is formed of two stampings 1 and 2 pressed together with an air tight fit. This reservoir is removable from the base for filling through tubular aperture D and replacable to the base, which has an annular oil container B, into which said aperture D is submerged into the oil which fills said container. This closing of aperture D by the oil in container B prevents air from entering the reservoir in the latter of which the oil is sustained by atmospheric pressure. When the lubricator is secured by threaded stem E to the part of the machine to be lubricated, as on an automobile or truck, there is practically no movement of the oil, except when the lubricator is subjected to shocks and jars, then the oil in the container B is so shaken that particles of it are thrown into the outlet C. I prefer to make the overflow break up into small particles by a serrated edge I, and I also prefer to retard the flow in outlet C by means of a packing 4 of felt or wicking, selected as to density according to the required adjustment of the flow of oil. When sufficient oil has been shaken or splashed out of the container B, so that the level of the oil in it is below the opening or outlet from the reservoir, air is admitted to said reservoir until sufficient oil has poured into container B to lift the level or surface elevation as to close outlet D of the reservoir against further admission of air.

Fig. 2 shows the container B in the bowl of an angle elbow to which the reservoir is screwed. Washer M is selected as to thickness to meet the required elevation of aperture D relative to outlet C. P shows a wicking stopper.

Fig. 3 shows the container B as adjustable in elevation relative to aperture D of the reservoir A by means of a threaded supporting stem which is fluted to allow the passage of oil.

Fig. 4 shows the container B supported by a spring F and guided in a possible vertical movement by a piston G here shown as a screw, whose head seals the outlet C against an overflow when not in use, and when in use the flow of oil is retarded by the closely fitting piston, and descends the clearance between the moving part G and the aperture C through which it plays when subject to vertical jars. A small aperture H is shown in the side of tube D to improve the circulation in the admission of air.

Fig. 5 shows a horizontal section of the construction illustrated in Fig. 1 in a line across the bayonet clutch J, illustrating the clutch more fully and showing the screw driver slot K in the end of threaded stem E, which slot facilitates securing of the lubricator in place.

Fig. 6 shows a slight modification of the bayonet slot connection illustrated in Fig. 1, in that the slot is in this instance inclined, which facilitates an adjustment of elevation between aperture D of reservoir A and the edge I of the outlet of container B. This view also shows the packing 4 of felt or wicking rising about the edge I.

The washer or wicking in container B is shown closing aperture D of reservoir, to offer frictional resistance to the discharge of oil from said reservoir under the conditions of vibrations and jars to which it is subject. Under the impulse of the momentum in sudden vertical vibrations more oil is likely to be discharged than desired, under which condition if the oil is held to the opening by a wicking, it is less liable to admit air when the oil level in container B really does not warrant it.

I do not limit myself to these constructions but they are sufficient to show my invention.

To operate my invention fill with liquid oil, secure in proper place on a machine to be lubricated, and subject it to jars and vibrations.

I claim:

1. As an article of manufacture, an oil cup having a threaded hollow stem forming a duct, said oil cup including a container communicating with the duct and also including a sealed reservoir above the container and opening therein, the liquid in the container forming a seal for the outlet from the reservoir.

2. As a unitary article of manufacture, an oil cup having a reservoir in which oil is sustained by atmospheric pressure, said oil cup also having an oil container below the reservoir and supplied with oil therefrom, said oil cup including a hollow threaded stem through which oil is restrictedly fed to a part to be lubricated.

3. As an article of manufacture, an oil cup including a reservoir and a container immediately below the reservoir and a thin dividing wall forming the bottom of the reservoir and the top of the container, said wall being perforated and depending down into the container around the perforation to form a seal with the liquid in said container, and a single means for attaching the cup to a part to be lubricated and for conducting oil from the container.

4. A cup-shaped lubricator including a closed upper chamber for lubricating fluid and a lower chamber separated by a partition that dips into the lower chamber and forms a seal with lubricating fluid therein, said lubricator including a perforated threaded stem leading from the lower chamber whereby it may be attached to a part to be lubricated and through which oil may be fed from said lower chamber.

5. As an article of manufacture, an oil cup forming a reservoir closed at its upper end and a container communicating therewith, an outlet for the container at a point above the outlet from the reservoir to said container, the oil cup forming an air chamber between said two outlets, the parts being so constructed and arranged that oil may be shaken from the container through the first named outlet.

6. An oil cup including a container having a passage through which oil is shaken to a part to be lubricated, a closed reservoir communicating with the container at a point slightly below the point at which the passage connects with the container, said container forming a closed air chamber except insofar as it communicates with the reservoir and the passage, whereby the level of oil in the container is normally maintained slightly below the entrance to the passage.

7. In a lubricator, an oil reservoir constructed of two cup-shaped metal stampings having the open ends of each permanently closed by the other, said reservoir having an aperture at the lower end eccentric to its circular end, a cup-shaped support for the reservoir, said aperture being normally closed by oil standing in an annular groove in the cup-shaped support.

8. In a lubricator, an oil reservoir in which oil is sustained by atmospheric pressure, said reservoir having an aperture, another container adapted to contain oil by which said aperture is closed, a wick to which oil may be shaken from the second container, said wick being normally out of communication with the supply of oil in the lubricator.

9. As an article of manufacture, an oil cup including a reservoir closed at its upper end and adapted to retail oil therein by atmospheric pressure, said oil cup also including a passage through which oil flows from said reservoir by gravity, said passage including a portion beyond its point of connection with the reservoir and higher than said point of connection, through which portion oil is shaken from the cup in the normal operation thereof.

10. As an article of manufacture, an oil cup including a reservoir closed at its upper end and adapted to retain oil therein by atmospheric pressure, said oil cup also including a passage through which oil flows from said reservoir by gravity, said passage including a portion beyond its point of connection with the reservoir and so constructed and arranged as to form a trap for preventing air in said passage from entering the reservoir and for permitting oil to be gradually shaken from the cup in the normal operation thereof.

HUSTON TAYLOR.

Copies of this patent may be obtained for five cents each, by addressing the "Commissioner of Patents, Washington, D. C."